UNITED STATES PATENT OFFICE.

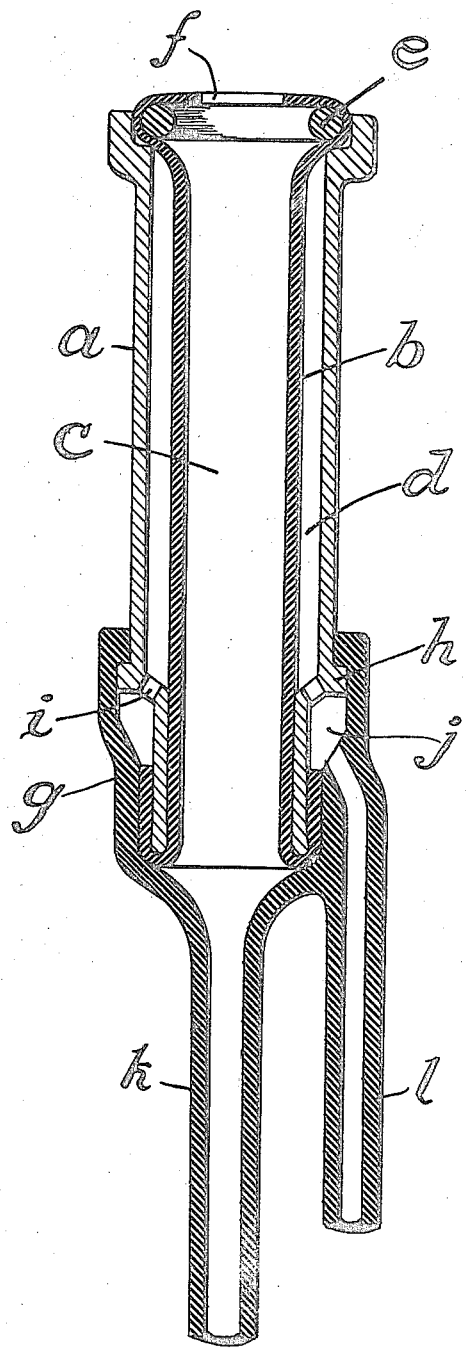

MEREDITH LEITCH, OF POUGHKEEPSIE, NEW YORK, ASSIGNOR TO THE DE LAVAL SEPARATOR COMPANY, A CORPORATION OF NEW JERSEY.

MILKING-MACHINE TEAT-CUP.

1,239,923.

Specification of Letters Patent. Patented Sept. 11, 1917.

Application filed October 16, 1916. Serial No. 125,833.

*To all whom it may concern:*

Be it known that I, MEREDITH LEITCH, a citizen of the United States, residing at Poughkeepsie, county of Dutchess, and State of New York, have invented a new and useful Improvement in Milking-Machine Teat-Cups, of which the following is a full, clear, and exact description, reference being had to the accompanying drawings, which form a part of this specification.

My invention relates to milking machine teat cups of the class having a central teat receiving chamber and an annular pulsation chamber. The object of my invention is to provide a teat cup that is sanitary and is easily assembled.

The accompanying drawing shows a longitudinal section of a teat cup embodying my invention in its preferred form.

The rigid, or comparatively rigid, shell $a$ is preferably made of hard rubber or celluloid. The liner $b$ forms a flexible partition between the inner teat chamber $c$ and the outer annular pulsation chamber $d$. The upper part of the liner is stretched around a ring $e$ and forms a mouth $f$ to surround the base of the teat. The lower end of the liner is turned back around the lower end of the shell and is secured in place by forcing over and around it a soft rubber cap $g$. The upper part of this cap is shaped to fit over a bead $h$ on the cup shell $a$. The lower end of the shell $a$ is preferably of smaller diameter than the remainder of the shell. Through the shouldered portion of the shell connecting its narrower and wider portions are several holes $i$ which provide communication between the pulsation chamber $d$ and a small annular chamber $j$ around the lower part of the shell inside the cap $g$. The chamber $j$, it will be observed, is formed when the cap $g$ is applied to the shell $a$ as described. Formed in one piece with the cap $g$ is a milk tube $k$ and also a pulsation tube $l$. When the cap $g$ is applied to the shell $a$ and the liner $b$, the milk tube $k$ communicates with the milk chamber $c$ and the pulsation tube $l$ communicates with the pulsation chambers $j$ and $d$.

When in use the milk tube $k$ is connected to a source of suction, generally a partial vacuum of about 15 inches of mercury, and the pulsation tube is connected to a source of pneumatic pulsations, generally produced by connecting the tube alternately to the source of suction and to the atmosphere.

I am aware that teat cups have been made with rigid shells having a pulsation nipple attached thereto and having screw collars for clamping a metallic cap against the liner to hold the lower end thereof, but such cups are necessarily slower to assemble and disassemble; hence there is a tendency to neglect thorough cleaning.

The shell of my cup, having no threads, is particularly adapted for manufacture from hard rubber, celluloid or similar non-corrodible material, so that the entire cup may be placed in a germicidal solution for an indefinite time without injury.

Having now fully described my invention, what I desire to claim and protect by Letters Patent is:

1. In a milking machine teat cup, the combination with a rigid shell and a flexible liner engaging the shell at both ends, of a flexible cap and a milk tube formed integral therewith, said cap retaining the lower end of the liner in position on the shell.

2. In a milking machine teat cup, the combination with a rigid shell and a flexible liner engaging the shell at both ends, of a flexible cap and a pulsation tube formed integral therewith, said cap retaining the lower end of the liner in position on the shell.

3. In a milking machine teat cup, the combination with a rigid shell and a flexible liner engaging the shell at both ends, of a flexible cap and a milk tube and pulsation tube formed integral therewith, said cap between its tubes engaging the liner and holding it in position on the shell.

4. In a milking machine teat cup, the combination with a rigid shell and a flexible liner whose lower end is turned up around the lower end of the shell, of a flexible cap retaining the liner in position on the shell and a milk tube and a pulsation tube formed integrally with the cap.

5. In a milking machine teat cup the combination with a flexible cap, a milk tube communicating with the lower end of the cap, and a pulsation tube opening into the side wall of the cap, of a rigid shell, and a flexible liner engaging the shell, said cap at its upper end surrounding the shell and toward its lower end confining the liner to the shell at a point between the cap's milk tube opening and its pulsation tube opening, the shell being perforated to afford communication between the annular chamber formed between the liner and the shell and the annular chamber formed between the shell and the cap.

6. In a milking machine teat cup, the combination with a rigid shell having a large diameter for the upper major portion of its length, a small diameter for a lower minor portion of its length, and a bead around the larger diameter portion adjacent to the reduction in diameter, there being holes through the wall connecting the larger diameter portion with the small diameter portion, and a flexible liner turned upward around the small diameter portion, of a flexible elastic cap adapted to fit tightly around the upwardly turned liner and be secured in place by fitting tightly over the bead.

7. In a milking machine teat cup, the combination with a rigid shell having a contracted lower end and a flexible liner within the shell and engaging its lower end of means forming a pulsation chamber outside the lower contracted part of the shell, a milk tube communicating with the interior of the liner, and a pulsation tube communicating with the pulsation chamber, the shell being perforated to afford communication between the pulsation chamber and the annular chamber between the shell and the liner.

8. A device for attachment to the lower end of a teat cup, comprising a cap having an open top, a milk tube communicating with the base of the cap and a pulsation tube opening into the side wall of the cap.

In testimony of which invention, I have hereunto set my hand, at Poughkeepsie, on this 12th day of October, 1916.

MEREDITH LEITCH.